(12) United States Patent
Edmunds et al.

(10) Patent No.: US 7,638,056 B2
(45) Date of Patent: *Dec. 29, 2009

(54) TREATMENT OF SEWAGE SLUDGE

(75) Inventors: Stephanie Edmunds, Willenhall (GB);
Douglas Paul Gilbert, Whitstable (GB);
Eric Robert Talbot, Cannock (GB);
Manocher Asaadi, Purley on Thames
(GB); Peter Winter, Reading (GB)

(73) Assignee: Rhodia Operations, Aubervilliers (FR)

( * ) Notice: Subject to any disclaimer, the term of this patent is extended or adjusted under 35 U.S.C. 154(b) by 440 days.

This patent is subject to a terminal disclaimer.

(21) Appl. No.: 10/559,969

(22) PCT Filed: Jun. 21, 2004

(86) PCT No.: PCT/GB2004/002660

§ 371 (c)(1),
(2), (4) Date: Apr. 18, 2006

(87) PCT Pub. No.: WO2004/113237

PCT Pub. Date: Dec. 29, 2004

(65) Prior Publication Data

US 2006/0243674 A1 Nov. 2, 2006

(30) Foreign Application Priority Data

Jun. 20, 2003 (GB) .................... 0314363.3

(51) Int. Cl.
C02F 11/04 (2006.01)
C02F 11/14 (2006.01)
(52) U.S. Cl. .................... 210/631; 210/764; 422/28
(58) Field of Classification Search .......... 210/764
See application file for complete search history.

(56) References Cited

U.S. PATENT DOCUMENTS 4,673,509 A * 6/1987 Davis et al. .............. 210/699

(Continued)

FOREIGN PATENT DOCUMENTS

EP 0215562 3/1987

(Continued)

OTHER PUBLICATIONS

International Search Resort issued Nov. 5, 2004 in PCT/GB2004/002660.

*Primary Examiner*—Peter A Hruskoci
(74) *Attorney, Agent, or Firm*—Buchanan, Ingersoll & Rooney P.C.

(57) ABSTRACT

The present invention provides a method of reducing the pathogen content of sewage sludge comprising (a) adding to the sludge an effective amount of a phosphorous-containing compound and (b) keeping the phosphorous-containing compound in contact with the sludge for a sufficient time to reduce the amount of pathogens present in the sludge by an amount equivalent to a logarithmic reduction of 2 or more.

24 Claims, 3 Drawing Sheets

U.S. PATENT DOCUMENTS

| | | | |
|---|---|---|---|
| 4,966,716 A | * | 10/1990 | Favstritsky et al. ........... 210/755 |
| 5,385,896 A | * | 1/1995 | Bryan et al. ................. 514/129 |
| 5,422,015 A | * | 6/1995 | Angell et al. ................ 588/257 |
| 5,536,410 A | * | 7/1996 | Kitatsuji et al. ............. 210/626 |
| 5,599,461 A | * | 2/1997 | Peltier et al. ................ 210/764 |
| 5,670,055 A | * | 9/1997 | Yu et al. ..................... 210/698 |
| 5,741,757 A | * | 4/1998 | Cooper et al. ............... 504/153 |
| 5,965,033 A | | 10/1999 | Huss et al. |
| 6,001,158 A | * | 12/1999 | Elphingstone et al. ... 106/18.31 |
| 6,165,364 A | * | 12/2000 | Maunuksela et al. ........ 210/631 |
| 7,214,292 B2 | * | 5/2007 | Bowdery et al. .............. 162/78 |
| 7,407,590 B2 | * | 8/2008 | Ludensky et al. ........... 210/698 |

FOREIGN PATENT DOCUMENTS

| | | |
|---|---|---|
| FR | 2794118 | 12/2000 |
| JP | 2002-308713 | 10/2002 |

* cited by examiner

TREATMENT OF SEWAGE SLUDGE

This application is an application under 35 U.S.C. Section 371 of International Application Number PCT/GB2004/002660 filed on Jun. 21, 2004.

This invention relates to a method of treating sewage sludge and to a sludge treated by the aforesaid method.

The treatment of raw sewage generally includes a filtration stage (in which large solids and grit are removed) followed by a stage in which the aqueous phase is subjected to aerobic bacterial action to remove biodegradable substances. This latter stage involves "activated sludge" which is essentially a concentrated bacterial mass. Biodegradable substances need to be removed prior to the discharge of the aqueous phase into watercourses, e.g. rivers, otherwise the bacterial degradation of such substances in the river would consume dissolved oxygen resulting in fish deaths, odours and general degradation of the environment. During the degradation of the biodegradable substances, growth and multiplication of the bacteria occur, resulting in the accumulation of bacterial sludge requiring disposal.

Optionally, the excess sludge may be "digested" under anaerobic conditions where, essentially, the bacteria re-equilibrate under the new conditions to produce methane and reduce the biomass but, ultimately, there remains an irreducible mass of excess sludge which requires disposal. There are a number of methods of disposal, such as landfill and disposal at sea, both of which are disfavoured for environmental reasons. Alternatively, the excess sludge may be incinerated (expensive) or spread on to agricultural land and, in the latter case, the sludge can be used as a fertiliser/soil conditioner, which is a benefit.

Unfortunately, such sludge can contain significant concentrations of pathogens and, if so, the sludge requires disinfection to reduce to an acceptable environmental and sanitary level any pathogenic organisms present, before the disinfected sludge is spread to land. An indicator organism, used to quantify the pathogenic risk, is $E.\ coli$. For compliance with UK statutory provisions, for conventional treated sludge the level of $E.\ coli$ in the sludge must be reduced by 99% (i.e. a logarithmic reduction of 2) and the maximum acceptable level of $E.\ coli$ in the treated sewage sludge is $10^5$ per gram of dry sludge (gds). For enhanced treated sludge in the UK there should be no $Salmonella$ spp present and the level of $E.\ coli$ must be reduced by at least 99.9999% (i.e. a logarithmic reduction of 6). The maximum acceptable level of $E.\ coli$ in the enhanced treated sewage sludge is $10^3$ per gram of dry sludge. Similar statutory requirements are expected to be adopted across Europe and in the USA in the future.

Bacterial reduction may be accomplished in a variety of ways including lime treatment (messy, requires significant capital investment and poses severe handling problems) heat treatment (very expensive) or merely leaving the sludge in storage till the bacterial level falls within the required limit. For the latter situation, the very large volumes of sludge involved at most sewage treatment works cannot usually be stored for the requisite time due to insufficient storage capacity. Installing sufficient capacity is either impractical due to space considerations or involves large capital expenditure.

In theory, an alternative method of reducing the bacterial content of the sludge would be to apply a disinfectant. However, disinfectants evaluated hitherto have been found to take relatively long periods to reduce the bacterial content to an acceptable level, thus creating storage demands beyond the resources of most sewage-treatment works.

We have found that the use of a phosphorus-containing compound (especially a phosphonium salt) on sewage sludge can bring about a reduction in the pathogen content of the sludge equivalent to a logarithmic decrease of at least 2.

Accordingly, the present invention provides a method of treating sewage sludge to reduce the pathogen content of said sludge, the method comprising the steps of:
(a) adding to the sludge an effective amount of a phosphorus-containing compound; and
(b) keeping the phosphorus-containing compound in contact with the sludge for sufficient time to reduce the amount of pathogens present in the sludge by an amount equivalent to a logarithmic reduction of 2 or more.

In one embodiment the log reduction of 2 or more is achieved over a 24-hour period.

Preferably, the phosphorus-containing compound is kept in contact with the sludge for sufficient time to reduce the amount of pathogens present in the sludge by a log reduction of 3 or more and more preferably 4 or more.

The pathogens may be bacteria.

Preferably, the sludge has undergone anaerobic digestion, a process known to those skilled in the art, prior to step (a).

Preferably, the phosphorus-containing compound is a phosphonium compound, especially a tetrakis(hydroxyorgano)phosphonium salt or compound of formula (I)

$$[R'R''(CH_2OH)_2P^+]_n X^- \qquad (I)$$

wherein:

n is the valency of X;

R' and R", which may be the same or different, are selected from an alkyl, hydroxyalkyl, alkenyl or aryl moiety and X is an anion.

R' and R" are preferably between 1 and 20 carbon atoms in length.

X is preferably selected from the group consisting of chloride, sulphate, phosphate, acetate, oxalate and bromide.

Most preferably, the phosphonium compound is tetrakis (hydroxymethyl) phosphonium sulphate.

Alternatively, the phosphonium compound may be, for example, a tetrakis(hydroxymethyl) phosphonium chloride, tetrakis(hydroxymethyl) phosphonium bromide, tetrakis(hydroxymethyl)phosphonium phosphate, tetrakis(hydroxymethyl)phosphonium acetate or tetrakis(hydroxymethyl)phosphonium oxalate.

Alternatively, the phosphorus-containing compound may be an alkyl-substituted phosphine, e.g. tris(hydroxymethyl) phosphine as shown in formula (II):

$$(CH_2OHR_2)P \qquad (II)$$

wherein:

each R, which may be the same or different, is selected from a alkyl, hydroxyalkyl, alkenyl or aryl moiety.

The amount of phosphorus-containing compound to be added to the sludge in step (a) of the method of the present invention is suitably up to 10000 mg/l, preferably 100-2500 mg/l, and especially 200-1000 mg/l.

Alternatively, the amount of phosphorus-containing compound to be added to the sludge may be expressed relative to dry solids weight. Suitably, the amount to be added is up to about 30% by weight of dry solids. Preferably, the amount of phosphorus-containing compound to be added may be from 0.1 to 20%, for example, 0.1 to 10%, such as 0.2 to 5% or 0.4 to 2% by weight of dry solids.

Step (b) of the method of the present invention may be carried out over a period of from 1 second to 14 days. For example, from 6 to 24 hours, from 1 to 6 hours, from 1 to 60 minutes, from 1 to 60 seconds or from 1 to 15 seconds.

The rate of addition of the phosphorus-containing compound and the rate of mixing are important in maximising the efficacy of the process. To maximise efficacy, both should be as short as practically possible and contact time should be maximised. In processes involving natural gravity settling of the sewage sludge step (b) is preferably 6 to 24 hours. In processes where the treated sludge is, optionally, dewatered by, e.g. centrifuge or filter press, to produce 'sludge cake', step (b) is preferably carried out in 15 seconds to 24 hours. 'Sludge cake' has substantially higher solids content than liquid sludge. Dewatering aids such as polydiallyl-dimethyl ammonium chlorides, polyamines, cationised polyacrylamides and anionic polyacrylamides may be utilised in the production of 'sludge cake'.

The pathogens present in the sludge are suitably selected from the group consisting of:
  bacteria, including *Escherichia coli*, *Salmonella* spp., *Shigella* spp., *Vibrio cholerae*, *Bacillus cereus*, *Listeria monocytogenes*, *Campylobacter* spp and *Yersinia pestis*;
  viruses, including rotaviruses, calciviruses, group F adenoviruses and astroviruses;
  protozoans, including *Entamoeba* spp., *Giardia* spp., *Balantidium coli* and *Cryptosporidium* spp.; and
  helminths and their eggs, including nematodes, for example, *Ascaris lumbricoides* (roundworm), *Trichuris trichiura* (whipworm), *Ancylostoma duodenale* (hookworm), *Strongyloides stercoralis* (threadworm); trematodes, for example, *Schistosoma* spp.; and cestodes, for example, *Taenia saginata* (beef tapeworm) and *Taenia solum* (pork tapeworm).

Preferably the method according to the present invention provides from a two to six log reduction of the pathogens present in the sludge.

A two-log reduction is defined by 99% of the pathogens present in the sludge being eliminated. Sludge treated in this way is termed 'conventionally treated sludge'. A six-log reduction is defined by 99.9999% of the pathogens present in the sludge being eliminated. Sludge treated in this way is termed 'enhanced treated sludge'.

The present invention further provides a sewage sludge that has been treated according to the method described hereinabove.

The present invention will be illustrated by way of the following Examples.

In the Examples, the phosphorus-containing compound used to treat sewage sludge was 75% w/w tetrakis(hydroxymethyl) phosphonium sulphate, available from Rhodia Consumer Specialties Limited. For the purposes of this patent specification, the product will be subsequently referred to as "Phosphonium Salt".

As a comparison, sewage sludges were treated with a conventional disinfectant compound, dibromo-nitrilo-propionamide (DBNPA).

In each Example, the bacterium being observed was *E. coli*.

1.1 Methodology

The methodology adopted to evaluate biocide performance was by Quantitative Suspension Test (QST) using sterile anaerobic digester sludge as the QST medium, back-inoculated with *E. coli* cultures previously isolated from the sludge. In this way, a consistent chemical environment (sterile sludge) could be used in conjunction with a defined bacterial challenge. This enables the provision of consistency between tests.

1.2 Microbiological Evaluations

Sterile sludge was prepared from raw sludge samples by autoclaving at 121° C. for 20 minutes. The *E. coli* strains used in QST had been isolated from raw-sludge samples.

QST were performed as follows:
  Sterile sludge (19 ml) was dispensed into sterile, screw-cap, plastics universal bottles of nominal 30 ml capacity.
  To each sample was added 0.5 ml of a washed cell suspension of *E. coli* prepared from a 16-hour culture incubated at 44° C. in Tryptose Soy Broth, which had been centrifuged (14500 rpm for 10 min.) and re-suspended in sterile phosphate buffer (0.2M at pH 7.2). An inoculum of 0.5 ml was sufficient to provide a final cell concentration of about $10^8$ per ml in 20 ml of QST medium.
  Fresh stock solutions of the candidate treatment chemicals were prepared in sterile phosphate buffer (0.2M at pH 7.2) at concentrations such that when 0.5 ml was added to the QST medium (final volume 20 ml) the desired final concentration of biocide was achieved.
  The QST medium was mixed thoroughly and held at 22° C. for the duration of the test.
  At intervals during the test, the sludge was well mixed and samples (1.0 ml) were removed from the QST medium and inoculated into the first tube of a dilution series containing MacConkey broth supplemented with sodium thiosulphate (5.0 g/l), to inactivate any residual biocide carried into the dilution series. This was carried out in duplicate.
  The remainder of the serial dilution (10 fold steps) was carried out in MacConkey Broth alone and tubes incubated at 44° C. for 16 hours.
  The end point was scored as the highest dilution in the series to show a change in colour from purple to yellow and to have developed turbidity.
  MacConkey Broth was selected as this medium contains the pH indicator Bromocresol Purple that changes from purple to yellow as the medium becomes acidic. This is a useful indirect indicator of microbial growth (organic acid production) where this cannot be scored by the development of turbidity in an initially clear medium. Because the sludge contains suspended solids the first 2 tubes of the dilution series instantaneously develop turbidity on the addition of the sludge. This precludes using turbidity alone as an indicator of microbial growth.

The biocides used in the evaluations are shown in the Table below.

| BIOCIDE TYPE | ACTIVE INGREDIENT (ai) | PERCENT ai |
|---|---|---|
| Phosphonium Salt | THPS | 75 |
| DBNPA | DBNPA | 98 |

EXAMPLES 1 to 3

Figure 1:
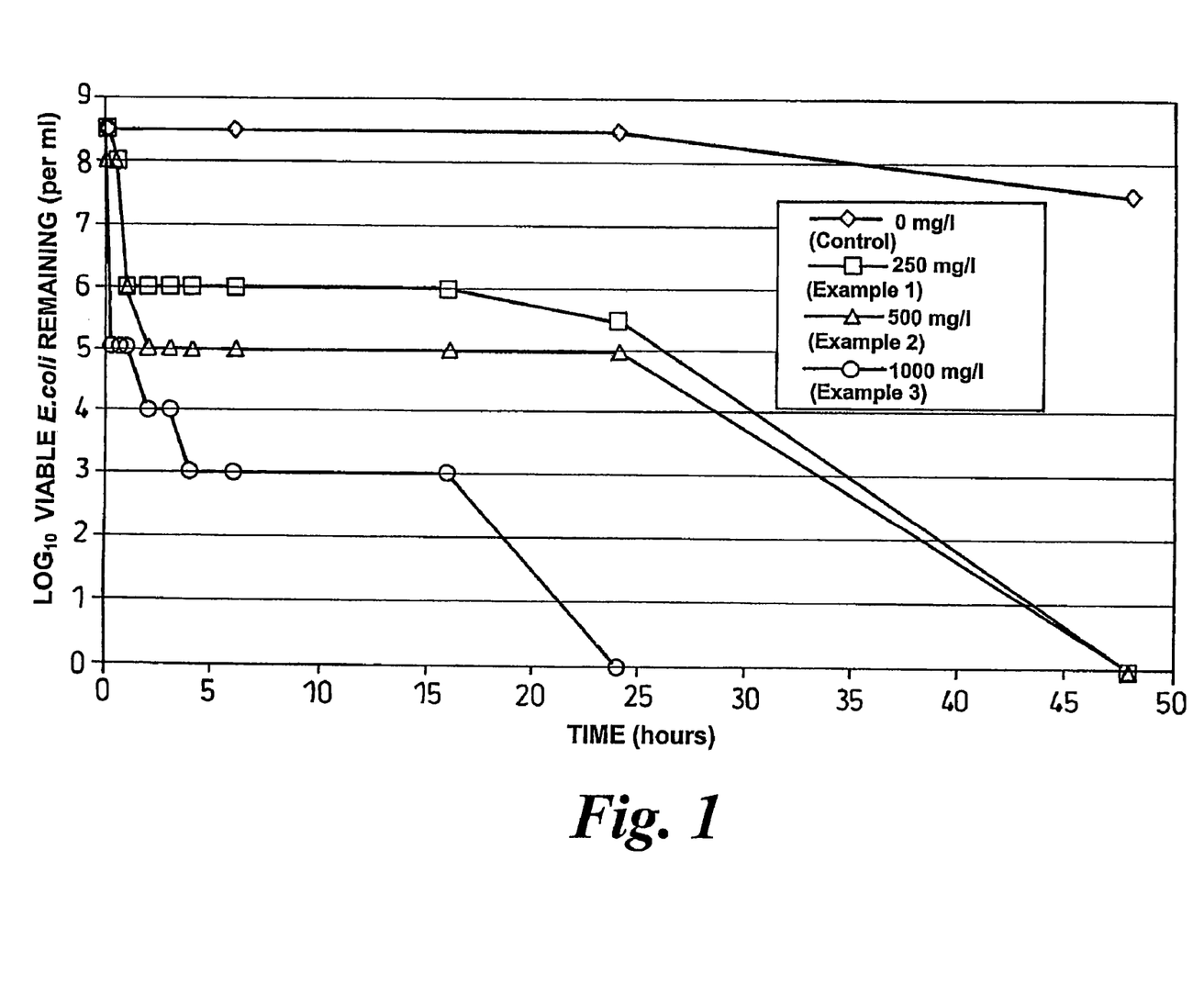
FIGS. 1-3 illustrate comparative performance of biocides used in the Examples.

The performance of Phosphonium Salt in the concentration range 250 to 1000 mg/l is illustrated in FIG. 1 of the accompanying drawings. Concentrations of 250 and 500 mg/l gave similar results with a fairly flat time/kill response over the first 6 hours contact time, followed by a reduction in numbers to a total kill within 48 hours.

By contrast, the time/kill response at 1000 mg/l was much faster: The time/kill response over the first 6 hours contact time was more progressive and total kill was achieved within 24 hours.

Figure 2:
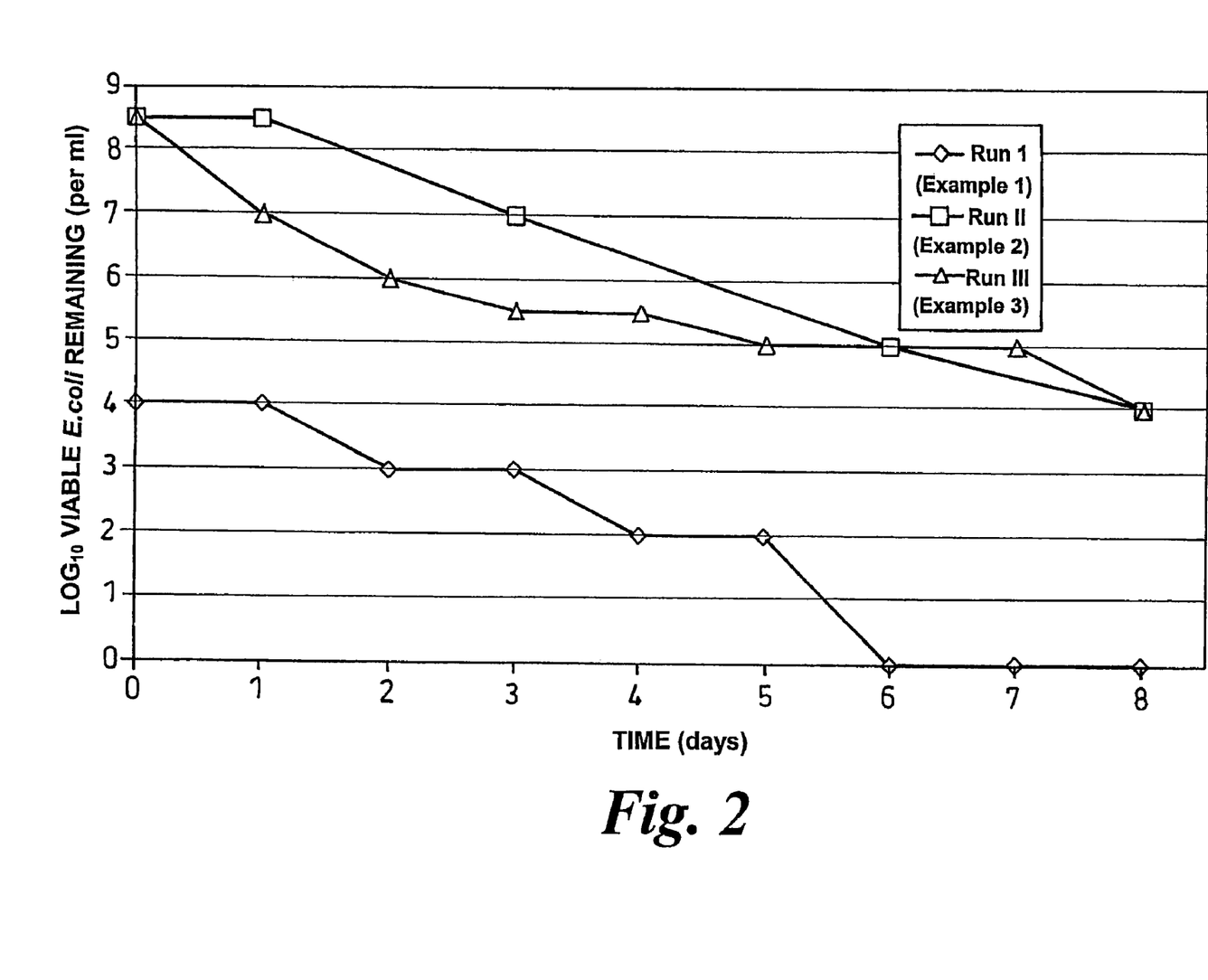

For comparison, the *E. coli* levels in untreated sludge slowly decrease naturally, over a time period as shown in FIG.

2. Even starting at the low *E. coli* level of $10^4$ cfu/gds it took 6 days to achieve total kill. Starting at the higher level of $10^{8.5}$ cfu/gds, the level had only reduced to $10^4$ cfu/gds after 8 days. The benefit of phosphonium salt treatment (FIG. 1) is therefore effectively displayed.

EXAMPLE 4

Figure 3:
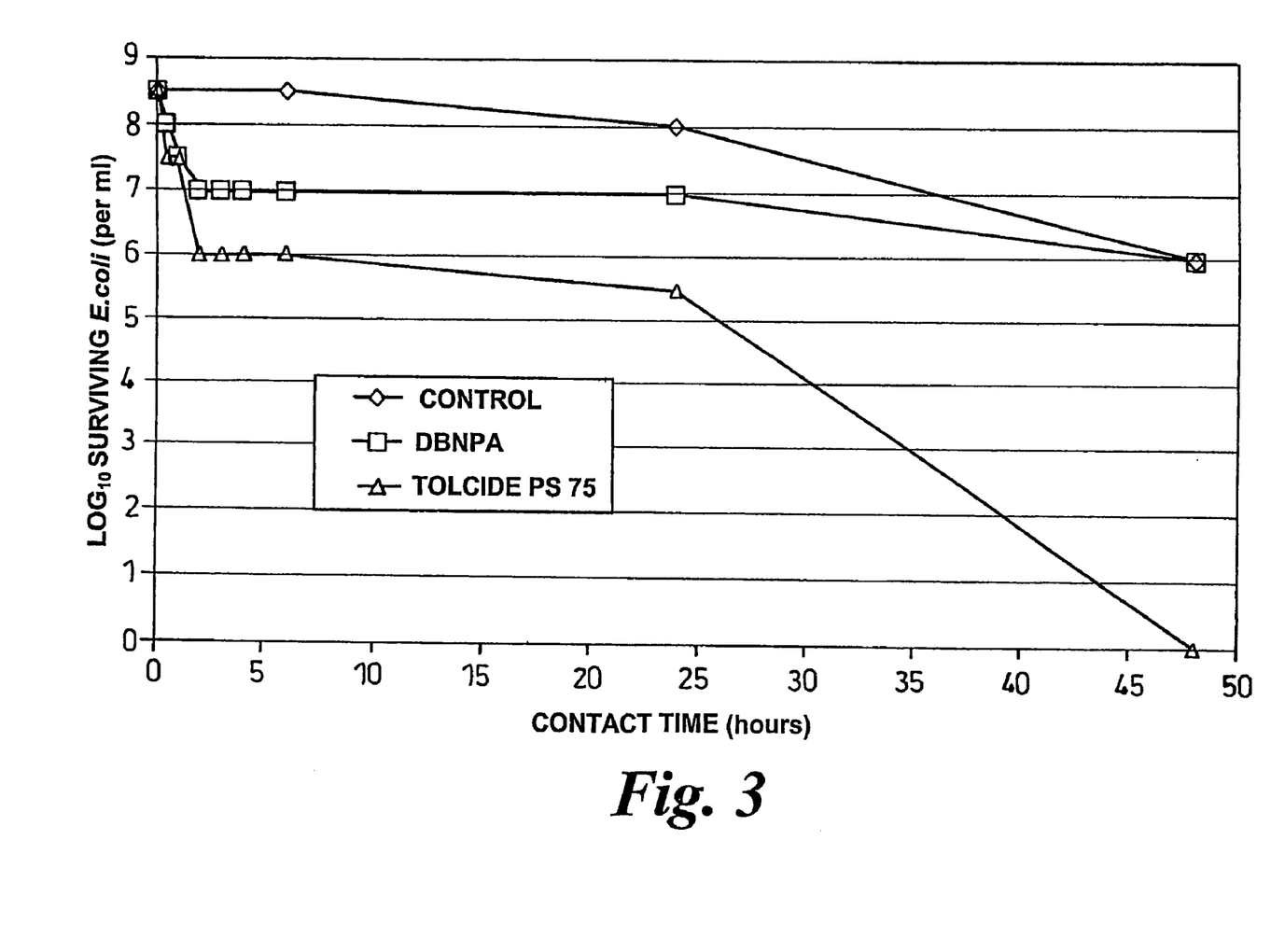

The performance of Phosphonium Salt compared to that of DBNPA, is shown in FIG. 3 of the accompanying drawings. Both biocides were tested at an equal active-ingredient concentration of 500 mg/l. DBNPA shows surprisingly poor antimicrobial performance, achieving only a 2.5 log reduction in numbers after 48 hours.

The foregoing Examples demonstrate the following characteristics of the present invention:
 (a) Increasing the Phosphonium Salt concentration used in treatment from 500 to 1000 mg/l gives a significant improvement in performance.
 (b) In all of the treatments evaluated total kill was achieved.
 (c) When compared with the performance of DBNPA, the performance of Phosphonium Salt was superior.

The invention claimed is:

1. A method of treating sewage sludge to reduce the pathogen content of said sludge, the method comprising the steps of:
   (a) adding to the sludge an effective amount of a phosphorus-containing compound, wherein the phosphorus-containing compound is a phosphonium compound, wherein the phosphonium compound is either:
      (i) a tetrakis(hydroxyorgano)phosphonium salt; or
      (ii) a compound of formula (I)

[R'R''(CH$_2$OH)$_2$P$^+$]$_n$X$^-$  (I)

wherein:
   n is the valency of X;
   R' and R'', which are the same or different, are selected from an alkyl, hydroxyalkyl, alkenyl or aryl moiety and X is an anion; or
   wherein:
   the phosphorus-containing compound is an alkyl-substituted phosphine as shown in formula (II):

(CH$_2$OHR$_2$)P  (II)

wherein:
   each R, which are the same or different, is selected from an alkyl, hydroxyalkyl, alkenyl or aryl moiety; and
      (b) keeping the phosphorus-containing compound in contact with the sludge for sufficient time to reduce the amount of pathogens present in the sludge by an amount equivalent to a logarithmic reduction of 2 or more.

2. The method as claimed in claim 1, wherein the logarithmic reduction of 2 or more is achieved over a 24-hour period.

3. The method as claimed in claim 1, wherein the phosphorus-containing compound is kept in contact with the sludge for sufficient time to reduce the amount of pathogens present in the sludge by a logarithmic reduction of 3 or more.

4. The method as claimed in claim 3, wherein the phosphorus-containing compound is kept in contact with the sludge for sufficient time to reduce the amount of pathogens present in the sludge by a logarithmic reduction of 4 or more.

5. The method as claimed in claim 1, wherein the pathogens are bacteria.

6. The method as claimed in claim 1, wherein R' and R'' are between 1 and 20 carbon atoms in length.

7. The method as claimed in claim 1, wherein X is selected from the group consisting of chloride, sulphate, phosphate, acetate, oxalate and bromide.

8. The method as claimed in claim 1, wherein the phosphonium compound is tetrakis(hydroxymethyl) phosphonium sulphate.

9. The method as claimed in claim 1, wherein the phosphonium compound is selected from the group consisting of tetrakis(hydroxymethyl) phosphonium chloride, tetrakis(hydroxymethyl)phosphonium bromide, tetrakis(hydroxymethyl)phosphonium phosphate, tetrakis (hydroxymethyl) phosphonium acetate and tetrakis(hydroxymethyl)phosphonium oxalate.

10. The method as claimed in claim 1, wherein the amount of phosphorus-containing compound to be added to the sludge in step (a) is up to 10000 mg/l.

11. The method as claimed in claim 10, wherein the amount of phosphorus-containing compound to be added to the sludge is 100-2500 mg/l.

12. The method as claimed in claim 10, wherein the amount of phosphorus-containing compound to be added to the sludge is 200-1000 mg/l.

13. The method as claimed in claim 1, wherein the amount of phosphorus-containing compound to be added to the sludge is expressed relative to dry solids weight and the amount to be added is up to about 30% by weight of dry solids.

14. The method as claimed in claim 13, wherein the amount of phosphorus-containing compound to be added is from 0.2 to 5% by weight of dry solids.

15. The method as claimed in claim 1, wherein step (b) is carried out over a period of from 1 second to 14 days.

16. The method as claimed in claim 1, wherein the pathogens present in the sludge are selected from the group consisting of bacteria, viruses, protozoans and helminths.

17. The method as claimed in claim 16, wherein the bacteria are selected from the group consisting of *Escherichia coli, Salmonella* spp., *Shigella* spp., *Vibrio cholerae, Bacillus cereus, Listeria monocytogenes, Campylobacter* spp. and *Yersinia pesti.*

18. The method as claimed in claim 16, wherein the viruses are selected from the group consisting of rotaviruses, calciviruses, group F adenoviruses and astroviruses.

19. The method as claimed in claim 16, wherein the protozoans are selected from the group consisting of *Entamoeba* spp., *Giardia* spp., *Balantidium coli* and *Cryptosporidium* spp.

20. The method as claimed in claim 16, wherein the helminths are selected from the group consisting of *Ascaris lumbricoides* (roundworm), *Trichuris trichiura* (whipworm), *Ancylostoma duodenale* (hookworm), *Strongyloides stercoralis* (threadworm), *Schistosoma* spp., *Taenia saginata* (beef tapeworm), *Taenia solum* (pork tapeworm) and their eggs.

21. The method as claimed in claim 1, wherein the sludge has undergone anaerobic digestion prior to step (a).

22. The method as claimed in claim 1, wherein the amount of phosphorus-containing compound to be added to the sludge is expressed relative to dry solids weight and the amount to be added is up to about from 0.1 to 10% by weight of dry solids.

23. The method as claimed in claim 22, wherein the amount of phosphorus-containing compound to be added is from 0.4 to 2% by weight of dry solids.

24. The method as claimed in claim 1, wherein step (b) is carried out over a period of from 15 seconds to 24 hours.

* * * * *

```
                        SEQUENCE LISTING

<160> NUMBER OF SEQ ID NOS: 47

<210> SEQ ID NO 1
<211> LENGTH: 134
<212> TYPE: DNA
<213> ORGANISM: SARS Coronavirus

<400> SEQUENCE: 1
tacctctcca gctaggattt tctacaggtg ttaacttagt agctgtaccg actggttatg    60
ttgacactga aaataacaca gaattcacca gagttaatgc aaaacctcca ccaggtgacc   120
agtttaaaca tctt                                                     134

<210> SEQ ID NO 2
<211> LENGTH: 89
<212> TYPE: DNA
<213> ORGANISM: SARS Coronavirus

<400> SEQUENCE: 2
atgaattacc aagtcaatgg ttaccctaat atgtttatca cccgcgaaga agctattcgt    60
cacgttcgtg cgtggattgg ctttgatgt                                      89

<210> SEQ ID NO 3
<211> LENGTH: 28
<212> TYPE: DNA
<213> ORGANISM: Artificial
<220> FEATURE:
<223> OTHER INFORMATION: Amplification primer

<400> SEQUENCE: 3
tccaccaggt gaccagttta aacatctt                                        28

<210> SEQ ID NO 4
<211> LENGTH: 26
<212> TYPE: DNA
<213> ORGANISM: Artificial
<220> FEATURE:
<223> OTHER INFORMATION: Amplification primer

<400> SEQUENCE: 4
tagtagctgt accgactggt tatgtt                                          26

<210> SEQ ID NO 5
<211> LENGTH: 23
<212> TYPE: DNA
<213> ORGANISM: Artificial
<220> FEATURE:
<223> OTHER INFORMATION: Amplification primer

<400> SEQUENCE: 5
tacctctcca gctaggattt tct                                             23
```

```
<210> SEQ ID NO 6
<211> LENGTH: 24
<212> TYPE: DNA
<213> ORGANISM: Artificial
<220> FEATURE:
<223> OTHER INFORMATION: Amplification primer

<400> SEQUENCE: 6
atgaattacc aagtcaatgg ttac                                          24

<210> SEQ ID NO 7
<211> LENGTH: 20
<212> TYPE: DNA
<213> ORGANISM: Artificial
<220> FEATURE:
<223> OTHER INFORMATION: Amplification primer

<400> SEQUENCE: 7
gaagctattc gtcacgttcg                                               20

<210> SEQ ID NO 8
<211> LENGTH: 21
<212> TYPE: DNA
<213> ORGANISM: Artificial
<220> FEATURE:
<223> OTHER INFORMATION: Amplification primer

<400> SEQUENCE: 8
tgcgtggatt ggctttgatg t                                             21

<210> SEQ ID NO 9
<211> LENGTH: 53
<212> TYPE: DNA
<213> ORGANISM: Artificial
<220> FEATURE:
<223> OTHER INFORMATION: Amplification primer

<400> SEQUENCE: 9
aattctaata cgactcacta tagggaagat gtttaaactg gtcacctggt gga          53

<210> SEQ ID NO 10
<211> LENGTH: 51
<212> TYPE: DNA
<213> ORGANISM: Artificial
<220> FEATURE:
<223> OTHER INFORMATION: Amplification primer

<400> SEQUENCE: 10
aattctaata cgactcacta tagggaacat aaccagtcgg tacagctact a            51

<210> SEQ ID NO 11
<211> LENGTH: 48
<212> TYPE: DNA
<213> ORGANISM: Artificial
<220> FEATURE:
<223> OTHER INFORMATION: Amplification primer

<400> SEQUENCE: 11
aattctaata cgactcacta tagggagaaa atcctagctg gagaggta                48

<210> SEQ ID NO 12
<211> LENGTH: 56
<212> TYPE: DNA
<213> ORGANISM: SARS Coronavirus
```

<400> SEQUENCE: 12
gttcgtgcgt ggattggctt tgatgtagag ggctgtcatg caactagaga tgctgt        56

<210> SEQ ID NO 13
<211> LENGTH: 38
<212> TYPE: DNA
<213> ORGANISM: Artificial
<220> FEATURE:
<223> OTHER INFORMATION: Oligonucleotide probe
<220> FEATURE:
<221> NAME/KEY: misc_feature
<222> LOCATION: (1)..(1)
<223> OTHER INFORMATION: 5' 6-FAM label
<220> FEATURE:
<221> NAME/KEY: misc_feature
<222> LOCATION: (38)..(38)
<223> OTHER INFORMATION: 3' DabSyl label

<400> SEQUENCE: 13
ccatgggctg tcatgcaact agagatgctg tcccatgg        38

<210> SEQ ID NO 14
<211> LENGTH: 53
<212> TYPE: DNA
<213> ORGANISM: SARS Coronavirus

<400> SEQUENCE: 14
tcagccccag atggtacttc tattacctag gaactggccc agaagcttca ctt        53

<210> SEQ ID NO 15
<211> LENGTH: 21
<212> TYPE: DNA
<213> ORGANISM: Artificial
<220> FEATURE:
<223> OTHER INFORMATION: Amplification primer

<400> SEQUENCE: 15
tcagccccag atggtacttc t        21

<210> SEQ ID NO 16
<211> LENGTH: 26
<212> TYPE: DNA
<213> ORGANISM: Artificial
<220> FEATURE:
<223> OTHER INFORMATION: Amplification primer

<400> SEQUENCE: 16
taggaactgg cccagaagct tcactt        26

<210> SEQ ID NO 17
<211> LENGTH: 123
<212> TYPE: DNA
<213> ORGANISM: SARS Coronavirus

<400> SEQUENCE: 17
aggtttaccc aataatactg cgtcttggtt cacagctctc actcagcatg gcaaggagga        60
acttagattc cctcgaggcc agggcgttcc aatcaacacc aatagtggtc cagatgacca       120
aat        123

<210> SEQ ID NO 18
<211> LENGTH: 23
<212> TYPE: DNA
<213> ORGANISM: Artificial
<220> FEATURE:
<223> OTHER INFORMATION: Amplification primer

<400> SEQUENCE: 18
aggtttaccc aataatactg cgt                                                23

<210> SEQ ID NO 19
<211> LENGTH: 23
<212> TYPE: DNA
<213> ORGANISM: Artificial
<220> FEATURE:
<223> OTHER INFORMATION: Amplification primer

<400> SEQUENCE: 19
agattccctc gaggccaggg cgt                                                23

<210> SEQ ID NO 20
<211> LENGTH: 22
<212> TYPE: DNA
<213> ORGANISM: Artificial
<220> FEATURE:
<223> OTHER INFORMATION: Amplification primer

<400> SEQUENCE: 20
atagtggtcc agatgaccaa at                                                 22

<210> SEQ ID NO 21
<211> LENGTH: 630
<212> TYPE: DNA
<213> ORGANISM: SARS Coronavirus

<400> SEQUENCE: 21
ggctactacc gaagagctac ccgacgagtt cgtggtggtg acggcaaaat gaaagagctc         60
agccccagat ggtacttcta ttacctagga actggcccag aagcttcact tccctacggc        120
gctaacaaag aaggcatcgt atgggttgca actgagggag ccttgaatac acccaaagac        180
cacattggca cccgcaatcc taataacaat gctgccaccg tgctacaact tcctcaagga        240
acaacattgc caaaaggctt ctacgcagag ggaagcagag cggcagtca agcctcttct         300 cgctcctcat cacgtagtcg cggtaattca agaaattcaa ctcctggcag cagtaggga         360 aattctcctg ctcgaatggc tagcggaggt ggtgaaactg ccctcgcgct attgctgcta        420
gacagattga accagcttga gagcaaagtt tctggtaaag gccaacaaca acaaggccaa        480
actgtcacta gaaatctgc tgctgaggca tctaaaaagc ctcgccaaaa acgtactgcc         540
acaaaacagt acaacgtcac tcaagcattt gggagacgtg gtccagaaca acccaagga        600 aatttcgggg accaagacct aatcagacaa                                         630

<210> SEQ ID NO 22
<211> LENGTH: 39
<212> TYPE: DNA
<213> ORGANISM: Artificial
<220> FEATURE:
<223> OTHER INFORMATION: Oligonucleotide probe
<220> FEATURE:
<221> NAME/KEY: misc_feature
<222> LOCATION: (1)..(1)
<223> OTHER INFORMATION: 5' 6-FAM label
<220> FEATURE:
<221> NAME/KEY: misc_feature
<222> LOCATION: (39)..(39)
<223> OTHER INFORMATION: 3' DabSyl label

<400> SEQUENCE: 22
ccatgggcta ctaccgaaga gctacccgac gacccatgg                               39

<210> SEQ ID NO 23
<211> LENGTH: 59
<212> TYPE: DNA
<213> ORGANISM: SARS Coronavirus

<400> SEQUENCE: 23
tgctccaagt gcctctgcat tctttggaat gtcacgcatt ggcatggaag tcacacctt 59

<210> SEQ ID NO 24
<211> LENGTH: 24
<212> TYPE: DNA
<213> ORGANISM: Artificial
<220> FEATURE:
<223> OTHER INFORMATION: Amplification primer

<400> SEQUENCE: 24
tgctccaagt gcctctgcat tctt 24

<210> SEQ ID NO 25
<211> LENGTH: 21
<212> TYPE: DNA
<213> ORGANISM: Artificial
<220> FEATURE:
<223> OTHER INFORMATION: Amplification primer

<400> SEQUENCE: 25
ttggcatgga agtcacacct t 21

<210> SEQ ID NO 26
<211> LENGTH: 128
<212> TYPE: DNA
<213> ORGANISM: SARS Coronavirus

<400> SEQUENCE: 26
ccaaactgtc actaagaaat ctgctgctga ggcatctaaa aagcctcgcc aaaaacgtac 60
tgccacaaaa cagtacaacg tcactcaagc atttgggaga cgtggtccag aacaaaccca 120
aggaaatt 128

<210> SEQ ID NO 27
<211> LENGTH: 25
<212> TYPE: DNA
<213> ORGANISM: Artificial
<220> FEATURE:
<223> OTHER INFORMATION: Amplification primer

<400> SEQUENCE: 27
ccaaactgtc actaagaaat ctgct 25

<210> SEQ ID NO 28
<211> LENGTH: 23
<212> TYPE: DNA
<213> ORGANISM: Artificial
<220> FEATURE:
<223> OTHER INFORMATION: Amplification primer

<400> SEQUENCE: 28
ctcaagcatt tgggagacgt ggt 23

<210> SEQ ID NO 29
<211> LENGTH: 21
<212> TYPE: DNA
<213> ORGANISM: Artificial
<220> FEATURE:
<223> OTHER INFORMATION: Amplification primer

<400> SEQUENCE: 29
cagaacaaac ccaaggaaat t                                              21

<210> SEQ ID NO 30
<211> LENGTH: 32
<212> TYPE: DNA
<213> ORGANISM: Artificial
<220> FEATURE:
<223> OTHER INFORMATION: Oligonucleotide probe
<220> FEATURE:
<221> NAME/KEY: misc_feature
<222> LOCATION: (1)..(1)
<223> OTHER INFORMATION: 5' 6-FAM label
<220> FEATURE:
<221> NAME/KEY: misc_feature
<222> LOCATION: (32)..(32)
<223> OTHER INFORMATION: 3' DabSyl label

<400> SEQUENCE: 30
ccatggacca agacctaatc agacaaccat gg                                  32

<210> SEQ ID NO 31
<211> LENGTH: 72
<212> TYPE: DNA
<213> ORGANISM: SARS Coronavirus

<400> SEQUENCE: 31
tgcctatatg gaagagccct aatgtgtaaa attaatttta gtagtgctat ccccatgtga    60
ttttaatagc tt                                                        72

<210> SEQ ID NO 32
<211> LENGTH: 19
<212> TYPE: DNA
<213> ORGANISM: Artificial
<220> FEATURE:
<223> OTHER INFORMATION: Amplification primer

<400> SEQUENCE: 32
tgcctatatg gaagagccc                                                 19

<210> SEQ ID NO 33
<211> LENGTH: 23
<212> TYPE: DNA
<213> ORGANISM: Artificial
<220> FEATURE:
<223> OTHER INFORMATION: Amplification primer

<400> SEQUENCE: 33
tccccatgtg attttaatag ctt                                            23

<210> SEQ ID NO 34
<211> LENGTH: 102
<212> TYPE: DNA
<213> ORGANISM: SARS Coronavirus

<400> SEQUENCE: 34
tacgatacat agtctactct tgtgcagaat gaattctcgt aactaaacag cacaagtagg    60
tttagttaac tttaatctca catagcaatc tttaatcaat gt                      102

<210> SEQ ID NO 35
<211> LENGTH: 23
<212> TYPE: DNA
<213> ORGANISM: Artificial
<220> FEATURE:

<223> OTHER INFORMATION: Amplification primer

<400> SEQUENCE: 35
tacgatacat agtctactct tgt                                          23

<210> SEQ ID NO 36
<211> LENGTH: 22
<212> TYPE: DNA
<213> ORGANISM: Artificial
<220> FEATURE:
<223> OTHER INFORMATION: Amplification primer

<400> SEQUENCE: 36
taactaaaca gcacaagtag gt                                           22

<210> SEQ ID NO 37
<211> LENGTH: 20
<212> TYPE: DNA
<213> ORGANISM: Artificial
<220> FEATURE:
<223> OTHER INFORMATION: Amplification primer

<400> SEQUENCE: 37
tagcaatctt taatcaatgt                                              20

<210> SEQ ID NO 38
<211> LENGTH: 22
<212> TYPE: DNA
<213> ORGANISM: Artificial
<220> FEATURE:
<223> OTHER INFORMATION: Amplification primer

<400> SEQUENCE: 38
gccaccacat tttcatcgag gc                                           22

<210> SEQ ID NO 39
<211> LENGTH: 46
<212> TYPE: DNA
<213> ORGANISM: Artificial
<220> FEATURE:
<223> OTHER INFORMATION: Amplification primer

<400> SEQUENCE: 39
aattctaata cgactcacta tagggagaag taccatctgg ggctga                 46

<210> SEQ ID NO 40
<211> LENGTH: 51
<212> TYPE: DNA
<213> ORGANISM: Artificial
<220> FEATURE:
<223> OTHER INFORMATION: Amplification primer

<400> SEQUENCE: 40
aattctaata cgactcacta tagggaagtg aagcttctgg gccagttcct a           51

<210> SEQ ID NO 41
<211> LENGTH: 49
<212> TYPE: DNA
<213> ORGANISM: Artificial
<220> FEATURE:
<223> OTHER INFORMATION: Amplification primer

<400> SEQUENCE: 41
aattctaata cgactcacta tagggaagaa tgcagaggca cttggagca              49

```
<210> SEQ ID NO 42
<211> LENGTH: 46
<212> TYPE: DNA
<213> ORGANISM: Artificial
<220> FEATURE:
<223> OTHER INFORMATION: Amplification primer

<400> SEQUENCE: 42
aattctaata cgactcacta tagggaaggt gtgacttcca tgccaa         46

<210> SEQ ID NO 43
<211> LENGTH: 44
<212> TYPE: DNA
<213> ORGANISM: Artificial
<220> FEATURE:
<223> OTHER INFORMATION: Amplification primer

<400> SEQUENCE: 43
aattctaata cgactcacta tagggggggct cttccatata ggca          44

<210> SEQ ID NO 44
<211> LENGTH: 48
<212> TYPE: DNA
<213> ORGANISM: Artificial
<220> FEATURE:
<223> OTHER INFORMATION: Amplification primer

<400> SEQUENCE: 44
aattctaata cgactcacta tagggaagct attaaaatca catgggga       48

<210> SEQ ID NO 45
<211> LENGTH: 32
<212> TYPE: DNA
<213> ORGANISM: Artificial
<220> FEATURE:
<223> OTHER INFORMATION: Oligonucleotide probe
<220> FEATURE:
<221> NAME/KEY: misc_feature
<222> LOCATION: (1)..(1)
<223> OTHER INFORMATION: 5' 6-FAM label
<220> FEATURE:
<221> NAME/KEY: misc_feature
<222> LOCATION: (32)..(32)
<223> OTHER INFORMATION: 3' DabSyl label

<400> SEQUENCE: 45
cgcgatgttc gtgcgtggat tggcttatcg cg                        32

<210> SEQ ID NO 46
<211> LENGTH: 25
<212> TYPE: DNA
<213> ORGANISM: Artificial
<220> FEATURE:
<223> OTHER INFORMATION: Oligonucleotide probe
<220> FEATURE:
<221> NAME/KEY: misc_feature
<222> LOCATION: (1)..(1)
<223> OTHER INFORMATION: 5' biotin label

<400> SEQUENCE: 46
gctgtcatgc aactagagat gctgt                                25

<210> SEQ ID NO 47
<211> LENGTH: 32
<212> TYPE: DNA
<213> ORGANISM: Artificial
<220> FEATURE:
<223> OTHER INFORMATION: Oligonucleotide probe
<220> FEATURE:
```

```
<221> NAME/KEY: misc_feature
<222> LOCATION: (1)..(1)
<223> OTHER INFORMATION: 5' 6-FAM label
<220> FEATURE:
<221> NAME/KEY: misc_feature
<222> LOCATION: (32)..(32)
<223> OTHER INFORMATION: 3' DabSyl label

<400> SEQUENCE: 47
ccatgcgcca ccacattttc atcgaggcat gg                                  32
```